US012189346B2

(12) United States Patent
Yamamoto

(10) Patent No.: US 12,189,346 B2
(45) Date of Patent: Jan. 7, 2025

(54) WRIST DEVICE

(71) Applicant: CASIO COMPUTER CO., LTD., Tokyo (JP)

(72) Inventor: Keishirou Yamamoto, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 390 days.

(21) Appl. No.: 17/673,272

(22) Filed: Feb. 16, 2022

(65) Prior Publication Data

US 2022/0269222 A1 Aug. 25, 2022

(30) Foreign Application Priority Data

Feb. 24, 2021 (JP) ................................ 2021-027194

(51) Int. Cl.
*G04G 21/08* (2010.01)
*G04B 19/28* (2006.01)
*G04G 21/02* (2010.01)

(52) U.S. Cl.
CPC ........... *G04G 21/08* (2013.01); *G04B 19/283* (2013.01); *G04G 21/02* (2013.01)

(58) Field of Classification Search
CPC ........ G04G 21/08; G04G 21/02; G04G 21/00; G04B 19/283; G04C 3/001
USPC ........................................................... 368/11
See application file for complete search history.

(56) References Cited

U.S. PATENT DOCUMENTS

| | | | | |
|---|---|---|---|---|
| 7,648,266 B2 * | 1/2010 | Saunier | .................. | G04B 3/045 368/286 |
| 2005/0254353 A1 * | 11/2005 | Cogoli | .................. | G04G 21/00 368/281 |
| 2006/0034161 A1 * | 2/2006 | Muller | .............. | G04B 37/0427 368/281 |
| 2018/0220923 A1 * | 8/2018 | Shim | ...................... | A61B 5/742 |

FOREIGN PATENT DOCUMENTS

| | | | | |
|---|---|---|---|---|
| CN | 110058510 A * | 7/2019 | ........... | G04B 47/005 |
| FR | 2788608 A1 * | 7/2000 | ............. | G04B 3/045 |
| JP | S5999280 A | 6/1984 | | |
| JP | S60-158623 U | 10/1985 | | |
| JP | H6-62385 U | 9/1994 | | |
| JP | 2002-174688 A | 6/2002 | | |
| JP | 2005-292139 A | 10/2005 | | |

OTHER PUBLICATIONS

Notice of Reasons for Refusal dated Jan. 17, 2023 received in Japanese Patent Application No. JP 2021-027194.

* cited by examiner

*Primary Examiner* — Edwin A. Leon
*Assistant Examiner* — Kevin Andrew Johnston
(74) *Attorney, Agent, or Firm* — Scully, Scott, Murphy & Presser, P.C.

(57) ABSTRACT

A wrist device includes: a first input detector that detects a first input operation; a second input detector that is different from the first input detector and that detects a second input operation; a cover that is movable between a first position and a second position, the cover in the first position exposing the first input detector, the cover in the second position covering the first input detector; and at least one processor that receives the first input operation and the second input operation. The processor receives the second input operation as a valid operation in a case where the cover is in the second position.

7 Claims, 3 Drawing Sheets

WRIST DEVICE

CROSS-REFERENCE TO RELATED APPLICATIONS

This application is based upon and claims the benefit of priority from the prior Japanese Patent Application No. 2021-027194, filed on Feb. 24, 2021, the entire disclosure of which is incorporated herein by reference in its entirety.

TECHNICAL FIELD

The present disclosure relates to a wrist device.

BACKGROUND

There is known a wrist device that includes a rotatable bezel as a locking member, as disclosed in JP2005-292139A, for example. The bezel hides and protects an operation button when being rotated.

SUMMARY

According to an aspect of the present invention, there is provided a wrist device including: a first input detector that detects a first input operation; a second input detector that is different from the first input detector and that detects a second input operation; a cover that is movable between a first position and a second position, the cover in the first position exposing the first input detector, the cover in the second position covering the first input detector; and at least one processor that receives the first input operation and the second input operation, wherein the processor receives the second input operation as a valid operation in a case where the cover is in the second position.

BRIEF DESCRIPTION OF THE DRAWINGS

The accompanying drawings are not intended as a definition of the limits of the invention but illustrate embodiments of the invention, and together with the general description given above and the detailed description of the embodiments given below, serve to explain the principles of the invention, wherein.

DESCRIPTION OF EMBODIMENTS

Hereinafter, an embodiment of the wrist device according to the present invention is described with reference to FIG. 1A to FIG. 3. In this embodiment, the wrist device is a wristwatch as an example.

The embodiment described below is provided with various limitations technically preferable for carrying out the present invention. However, the scope of the present invention is not limited to the embodiment below or illustrated examples.

Figure 1A:
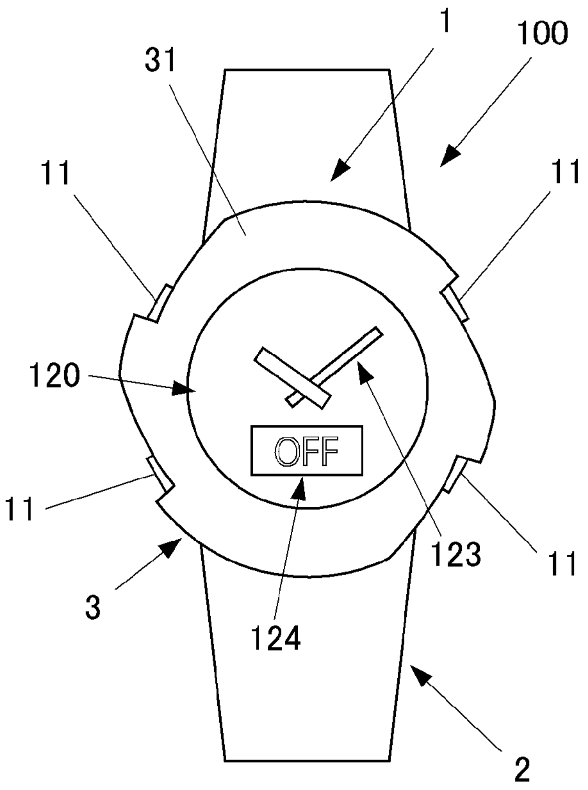
FIG. 1A is a front view of a wristwatch that includes a cover in an embodiment.
Figure 1B:
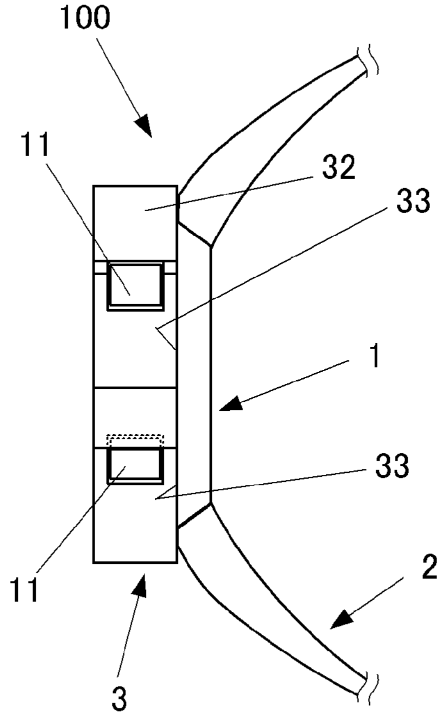
FIG. 1B is a lateral view of the wristwatch shown in FIG. 1A.
Figure 2A:
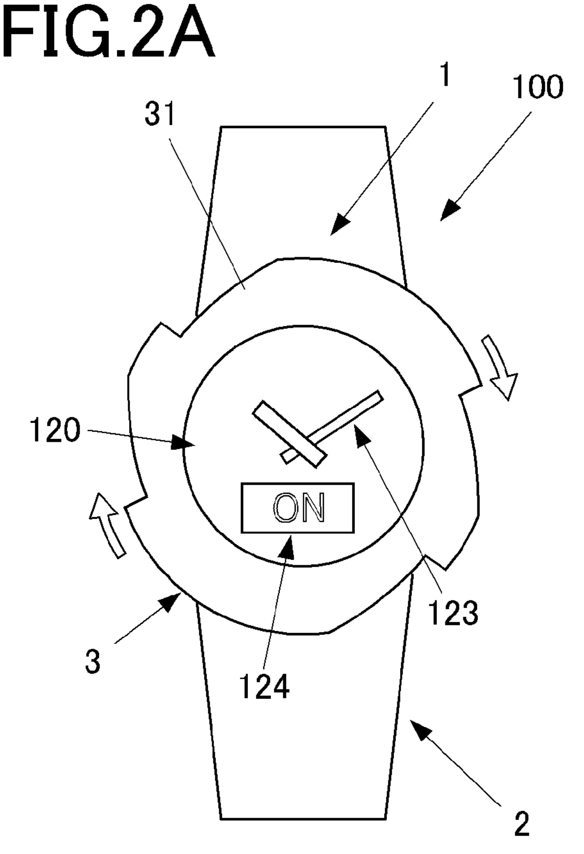
FIG. 2A is a front view of the wristwatch in the embodiment that includes the cover.
Figure 2B:
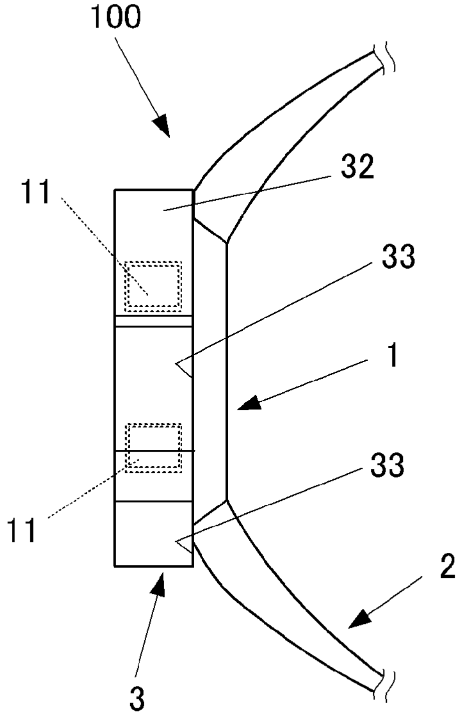
FIG. 2B is a lateral view of the wristwatch shown in FIG. 2A.

FIG. 1A and FIG. 2A show a front view of the wristwatch as the wrist device in this embodiment. FIG. 1B and FIG. 2B show a lateral view of the wristwatch as the wrist device in this embodiment.

Figure 3:
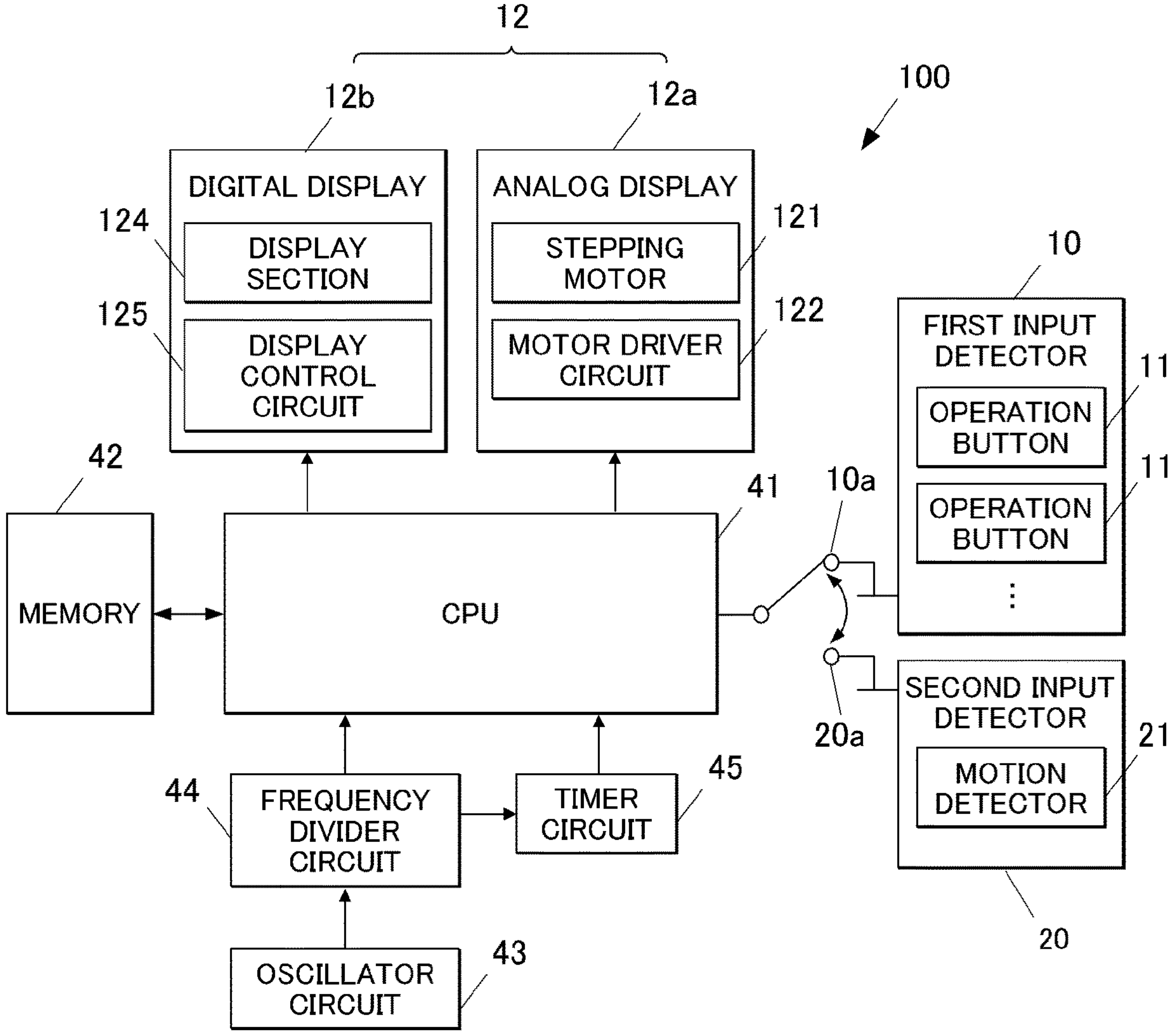
FIG. 3 is a schematic block diagram showing a control mechanism of the wristwatch in the embodiment.

FIG. 3 is a schematic block diagram showing a control mechanism of the wristwatch in this embodiment.

The wristwatch 100 in this embodiment shown in FIGS. 1A, 1B, 2A, 2B includes a case (hereinafter called watch case 1 in the description).

The watch case 1 is formed of metal (e.g., stainless, titanium), ceramic, or any kind of synthetic resin, for example. The material of the watch case 1 is not limited to these examples.

The watch case 1 in this embodiment has the shape of a hollow short column. The top and the bottom of the watch case 1 is open in the thickness direction.

The opening at the top surface side (visible side) of the watch case 1 is covered with a not-illustrated windscreen formed of a transparent glass, for example. The opening at the back side of the watch case 1 is covered with a not-illustrated back lid.

Multiple operation buttons 11 (first operation button 11, second operation button 11, . . . ) are provided at the lateral side of the watch case 1 (the outer circumferential side of the watch case 1). The operation buttons 11 receive various operation instructions, such as the instruction to set the time, the instruction to switch contents on a display section 124 to be described later, and the instruction to switch modes.

In this embodiment, four operation buttons 11 are arranged at substantially regular intervals. In the illustrated example, the operation buttons 11 are arranged at the positions corresponding to 2 o'clock, 4 o'clock, 8 o'clock, and 10 o'clock of an analog clock, respectively. The number and arrangement of operation buttons 11 is not limited to the illustrated example. There may be a single operation button 11 or more than five operation buttons 11.

In this embodiment, the operation buttons 11 are operation detectors (input detector) that detect input operations. The operation buttons 11 constitute the first input detector 10, as shown in FIG. 3. The operation buttons 11 are push buttons that generate input operation signals in response to being pushed, for example. The first input detector 10 is not limited to the push-type operation buttons 11. The first input detector 10 may include a not-illustrated crown that generates input operation signals in response to being pulled out and rotated.

The input operation signals generated by the operation buttons 11 are received by a central processing unit (CPU) 41 as a controller, when a first switch contact point 10*a* is connected to the CPU 41, as shown in FIG. 3.

The watch case 1 is attached with a band 2 so that the wristwatch body including the watch case 1 is attachable to an arm.

The wristwatch 100 further includes a clock face 120 at the front surface side (visible side of the watch) under the windscreen. On the clock face 120, hands 123 and a display section 124 of the display 12 are arranged. The layout on the clock face 120 is not limited to the illustrated example. Although FIG. 1A and other figures show the clock face 120 having two hands 123, the clock face 120 may have three hands 123: a second hand, a minute hand, and an hour hand. The clock face 120 may also have various other function pointers.

The watch case 1 houses components of the display 12, a not-illustrated watch module, and so forth. The watch module operates components of the wristwatch 100 including the display 12. The watch module includes the CPU 41, a memory 42, and various circuits to be described later (see FIG. 3), for example. The watch module is mounted on a not-illustrated substrate.

The watch case 1 in this embodiment is provided with a ring-shaped bezel 3 on the front surface side (visible side of the watch). The bezel 3 is provided so as to encircle the windscreen.

The bezel 3 includes a front part 31 and a lateral part 32. The front part 31 is positioned at the front surface side of the watch case 1 (visible side of the watch) so as to encircle the windscreen. The lateral part 32 hangs from the front part 31 and is provided along the lateral surface of the watch case 1.

As shown in FIG. 1B and FIG. 2B, the lateral part 32 has four windows 33 corresponding to the four operation buttons 11.

The bezel 3 of the wristwatch 100 (wrist device) in this embodiment serves as a cover that is able to be in a first position and a second position. In the first position, the bezel 3 exposes the operation buttons 11 as the first input detector 10. In the second position, the bezel 3 covers the first input detector 10.

The bezel 3 is rotatable by at least a certain angle along the outer circumference of the watch case 1. By being rotated, the bezel 3 can be in the first and second positions.

The shape and so forth of the bezel 3 is not limited to the illustrated example, as long as the bezel 3 is rotatable by at least a certain angle along the outer circumference of the watch case 1.

The bezel 3 may be rotatable clockwise or counterclockwise. The bezel 3 may be rotatable in both clockwise and counterclockwise directions. In this embodiment, the bezel 3 is rotatable clockwise, as shown by an outlined arrow in FIG. 2A.

In this embodiment, the bezel 3 is in the first position where the bezel 3 exposes the operation buttons 11. In the first position, the windows 33 are positioned so as to correspond to the operation buttons 11 (first input detector 10), as shown in FIGS. 1A, 1B. When the bezel 3 is rotated such that the parts other than the windows 33 are positioned so as to correspond to the operation buttons 11 (first input detector 10) as shown in FIGS. 2A, 2B, the bezel 3 is in the second position where the bezel 3 covers the operation buttons 11.

This embodiment has multiple operation buttons 11 (first input detector 10), as described above. When the bezel 3 (cover) is in the second position, the bezel 3 covers all the multiple operation buttons 11.

The shape and so forth of the bezel 3 is not limited to the illustrated example, as long as the bezel 3 can expose the operation buttons 11 (first input detector) in the first position and cover the operation buttons 11 in the second position.

For example, the parts (windows 33) for exposing the operation buttons 11 are formed so as to correspond to the positions of the first input detector. In the illustrated example, four operations buttons 11 (first input detector) are provided on the lateral surface of the watch case 1, and the windows 33 are also formed on the lateral part 32 of the bezel 3. When the operation buttons 11 are provided at the front surface side of the watch case 1 (visible side of the watch), the windows 33 are also formed on the front part 31 of the bezel 3.

Next, a functional configuration of the wristwatch 100 is described with reference to FIG. 3.

As shown in FIG. 3, the wristwatch 100 includes the CPU 41 as a controller and a memory 42 constituted of a not-illustrated read-only memory (ROM), random access memory (RAM), or the like.

The CPU 41 is a processor that performs various arithmetic processes and centrally controls overall operation of the wristwatch 100.

The memory 42 stores various programs to be executed by the CPU 41 and various kinds of data to be used for the programs. These programs and data are retrieved, executed, and used by the CPU 41 as necessary.

The wristwatch 100 further includes an oscillator circuit 43, a frequency divider circuit 44, and a timer circuit 45 (timer).

The oscillator circuit 43 generates a signal having a predetermined frequency and outputs the signal to the frequency divider circuit 44. The frequency divider circuit 44 divides the frequency signal input by the oscillator circuit 43, generates a signal having a frequency determined by a control signal from the CPU 41, and outputs the generated signal to the CPU 41. The frequency divider circuit 44 also generates a predetermined frequency signal (e.g., one-second signal) and outputs the signal to the timer circuit 45.

The timer circuit 45 is a counter that counts input frequency signals and keeps date and time (current time). The counter is not limited to a hardware counter circuit but may be a RAM that stores date and time counted by the CPU 41 through software, for example.

The wristwatch 100 includes the display 12 as described above. In this embodiment, the display 12 includes an analog display 12*a* and a digital display 12*b*. The CPU 41 controls components of the display 12 to display the date and time (current time) counted by the timer circuit 45 on the clock face 120.

The date and time (current time) may be displayed by either an analog system or a digital system, or by both systems.

The analog display 12*a* includes a stepping motor 121, a motor driver circuit 122, a not-illustrated wheel mechanism, and the hands 123.

The motor driver circuit 122 outputs driving pulses to the stepping motor 121 on the basis of control signals input by the CPU 41.

The stepping motor 121 performs stepping driving (rotates at a predetermined stepping angle) on the basis of the voltage waveform of the driving pulses input by the motor driver circuit 122.

The rotation of the stepping motor 121 is transmitted to the hands 123 via the wheel mechanism, which is constituted of a series of wheels. Accordingly, the hands 123 (e.g., hour hand and minute hand) are rotationally moved (rotated) by a predetermined angle in a regular or counter direction. The hands 123 thus indicate the date and time (current time) on the clock face 120.

The digital display 12*b* includes the display section 124 and a display control circuit 125.

The display section 124 is constituted of a liquid crystal display (LCD), an organic electroluminescent display (OEL), or any other flat display.

On the basis of control signals input by the CPU 41, the display control circuit 125 controls the contents displayed on the display section 124 of the clock face 120, so that the display section 124 displays the date and time (current time) and other contents.

The CPU 41 as the controller receives input operations from the first input detector 10 and the second input detector 20.

The first input detector 10 includes at least one operation button (four operation buttons 11 in this embodiment as described above). When a user operates the operation buttons 11, an input operation signal corresponding to the operation is generated.

The second input detector 20 includes a motion detector 21 that detects input operations by the user. The second input detector 20 generates input operation signals corresponding to the detection result. The motion detector 21 is, for example, an acceleration sensor that detects the acceleration of the wristwatch 100 as the wrist device. The motion detector 21 is not limited to the acceleration sensor. The motion detector 21 may be any other sensor, such as a gyro sensor that detects the rotation of the wristwatch 100, as long as the motion detector 21 is capable of detecting motions of the wristwatch 100 that are convertible into input operations.

The input operations of the user to be detected by the motion detector 21 (e.g., acceleration sensor) are predetermined motions, such as one large shake of the arm or two quick successive shakes of the arm. The correspondences between input operations and motions are determined and registered beforehand.

When detecting any of the predetermined motions, the motion detector 21 generates an input operation signal of the input operation corresponding to the detected motion.

The acceleration sensor or the like as the motion detector 21 constantly detects the acceleration of the wristwatch 100 even when the user is not performing the predetermined motion. The acceleration data detected by the acceleration sensor (motion detector 21) is constantly output to the CPU 41 as the controller, received by the CPU 41, and reflected on the contents displayed on the display 12.

When the bezel 3 (cover) is in the first position where the bezel 3 exposes the operation buttons 11 (first input detector), namely where the operation buttons 11 are exposed from the windows 33, the operation buttons 11 are in the state of being operable by the user.

In the state, the first switch contact point 10*a* is connected as shown in FIG. 3, and the CPU 41 receives the input operation signals generated by the operation buttons 11. The display section 124 of the digital display 12*b* may display "OFF" as shown in FIG. 1A, for example. "OFF" indicates that input operations with the operation buttons 11 are valid while input operations from the motion detector 21 are invalid (OFF).

When the bezel 3 is in the second position where the bezel 3 covers and protects the operation buttons 11 (first input detector) from external forces (i.e., where the portions other than the windows 33 of the bezel 3 cover the operation buttons 11), the operation buttons 11 are in the state of being inaccessible from outside and the user cannot operate the operation buttons 11.

In the state, the second switch contact point 10*a* is switched on, and the CPU 41 receives the input operation signals generated by the second input detector 20 (the motion detector 21, such as the acceleration sensor). The display section 124 of the digital display 12*b* may display "ON" as shown in FIG. 2A, for example. "ON" indicates that input operations with the motion detector 21 are valid (ON).

Thus, in this embodiment, when the operation buttons are protected and inaccessible, the input operations detected by the second input detector 20 different from the operation buttons 11 are valid. This allows the user to input an operation without returning the bezel 3 to the first position.

Next, the operation of the wristwatch 100 in this embodiment is described with reference to FIG. 1A to FIG. 2B.

In FIG. 1B and FIG. 2B, invisible operation buttons 11 covered by the lateral part 32 of the bezel 3 are depicted with dashed lines.

When the user wants to operate the wristwatch 100 with the operation buttons 11, the user adjusts the bezel 3 to the first position where the operation buttons 11 are exposed from the windows 33. In the first position, all the operation buttons 11 of the wristwatch 100 (four operation buttons 11 in this embodiment) are exposed from the respective windows 33 and operable.

When the user manipulates the operation buttons 11 as desired to input an operation (e.g., operation to display desired contents on the display section 124), the input operation signal corresponding to the operation is input to the CPU 41. The wristwatch 100 performs operations corresponding to the input operation signal, such as switching the contents on the display section 124.

When the user does not want to touch the operation buttons 11 or wants to protect the operation buttons 11 from external contacts, the user adjusts the bezel 3 to the second position, where the parts other than the windows 33 are positioned so as to correspond to the operation buttons 11 and the bezel 3 (lateral part 32 of the bezel 3) covers the operation buttons 11. In the second position, all the operation buttons 11 of the wristwatch 100 (four operation buttons 11 in this embodiment) are covered by the bezel 3 (lateral part 32 of the bezel 3) and not operable.

When the bezel 3 is in the second position, the connection is switched from the state where the first switch contact point 10*a* is connected to the state where the second switch contact point 10*b* is connected. Accordingly, input operation signals from the second input detector 20 (motion detector 21, such as the acceleration sensor) become valid.

For example, when the acceleration sensor as the motion detector 21 detects the acceleration of the wristwatch 100 corresponding to a predetermined motion, the motion detector 21 generates an input operation signal corresponding to the predetermined motion. When the bezel 3 is in the second position, the CPU 41 receives the input operation signal from the motion detector 21 (second input detector).

More specifically, predetermined motions (e.g., one slow shake, one quick shake, two slow shakes, and two quick shakes of the wristwatch 100) are associated with different operation instructions. When the acceleration sensor detects an acceleration, the sensor generates the input operation signal corresponding to the detected acceleration, and the CPU 41 receives the generated input operation signal. Thus, the user can switch the contents displayed on the display section 124 or do other desired operations.

For example, every time the wristwatch 100 is largely shaken one time, the contents displayed on the display section 124 may be successively switched from the time, the number of steps, to calorie consumption, or the modes may be switched from the time display mode to the stopwatch mode. In the stopwatch mode, every time the wristwatch 100 is quickly shaken twice, the wristwatch 100 may start/stop the stopwatch.

The correspondence between acceleration information of the wristwatch 100 to be detected by the motion detector 21 and input operation signals to be generated by the motion detector 21 may be set by default or by the user as desired. That is, the correspondence between detected motions and input operations may be set by default or by the user as desired. Even when the association is set by default, the user may be allowed to reset and customize the correspondence.

After rotating the bezel 3 to the second position where the bezel 3 covers and protects the operation buttons 11, the user can input an operation through the second input detector 20 (motion detector 21, such as the acceleration sensor) without returning the bezel 3 to the first position.

As described above, according to this embodiment, the wristwatch 100 as the wrist device includes: the operation buttons 11 (i.e., the first input detector 10 that detects an input operation); the second input detector 20 (i.e., the motion detector 21, such as the acceleration detector) that is different from the first input detector 10 and that detects an input operation; the bezel 3 as the cover that is movable between the first position and the second position, the bezel 3 in the first position exposing the first input detector 10, the bezel 3 in the second position covering the first input detector 10; and the CPU 41 as the controller that receives the input operations detected by the first input detector 10 and the second input detector 20. The CPU 41 receives the input operation detected by the second input detector 20 (motion detector 21, such as the acceleration detector) as a valid operation in a case where the bezel 3 is in the second position.

According to the above configuration, after rotating the bezel 3 to the second position where the bezel 3 covers the operation buttons 11, the user can input an operation through the second input detector 20 (motion detector 21 such as the acceleration sensor), which is different from the operation buttons 11, without returning the bezel 3 to the first position. Such a wristwatch 100 can be highly operable.

According to this embodiment, the second input detector 20 may include the motion sensor 21, such as the acceleration sensor that detects acceleration of the wristwatch 100. The CPU 41 may receive an input operation corresponding to the acceleration detected by the acceleration sensor (the motion sensor 21) as the second input operation when the bezel 3 is in the second position.

According to the above configuration, the user can easily operate the wristwatch 100 through predetermined motions, such as shaking the arm to which the wristwatch 100 is attached for a specific number of times at a specific speed (i.e., slowly or quickly). Such a wristwatch 100 is highly operable.

According to this embodiment, the cover is the bezel 3 that is rotatable at least by a certain angle, and can be in the first and second positions by being rotated.

Thus, the bezel 3 attached to the wristwatch 100 and serving as a cover eliminates the need for another cover. The wristwatch 100 with the bezel 3 can be highly operable without requiring additional components or deteriorating the design of the watch.

According to this embodiment, the first input detector 10 may include multiple operation buttons 11 (first and second buttons). When the bezel 3 is in the second position, the bezel 3 (lateral part 32 of the bezel 3) covers all the multiple buttons 11.

According to the above configuration, the bezel 3 can cover and protect the multiple operation buttons 11 simultaneously by being rotated only once. This allows the user to switch the position of the bezel 3 between the first position and the second position with a minimum action.

Although the embodiment of the present invention has been described, the present invention is not limited to the above-described embodiment and can be variously modified without departing from the scope of the invention.

For example, the above embodiment includes the first switch contact point 10*a* and the second switch contact point 20*a*, as shown in FIG. 3. In response to the bezel 3 being rotated, the CPU 41 can be connected to the first switch contact point 10*a* or the second switch contact point 10*b*. ON/OFF of the first input detector 10 and the second input detector 20 is thus mechanically switched. However, ON/OFF the first input detector 10 and the second input detector 20 may not be mechanically switched.

For example, the wristwatch 100 may determine which is valid, the input operation signal from the first input detector 10 or the input operation signal from the second input detector 20, through software. In the case, the first switch contact point 10*a* and the second switch contact point 20*a* shown in FIG. 3 are not required. This simplifies the configuration of the device.

The above embodiment includes the display 12 consisting of the analog display 12*a*, which indicates the time with the hands 123, and the digital display 12*b*, which has the small-window display section 124. However, the configuration of the display 12 is not limited to the embodiment.

Figure 4A:
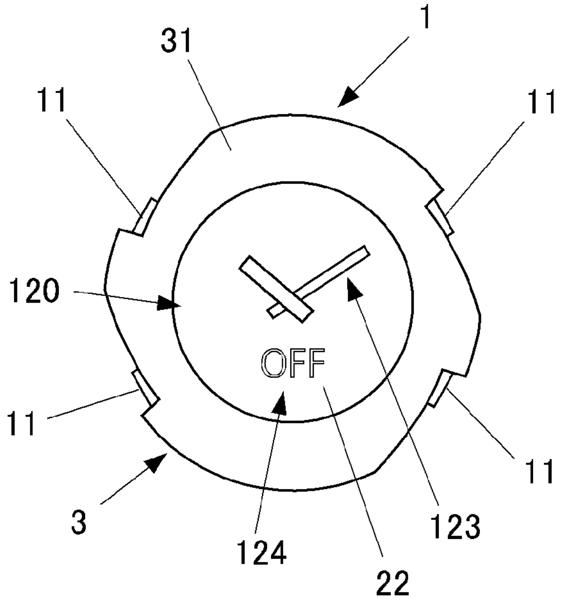
FIG. 4A is a schematic front view of the wristwatch with a modified display section, wherein the cover is in a first position.
Figure 4B:
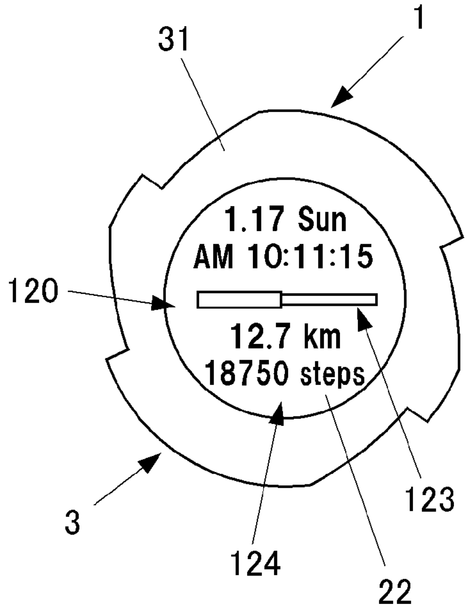
FIG. 4B is a schematic front view of the wristwatch with the modified display section, wherein the cover is in a second position.

For example, the display section 124 of the digital display 12*b* may be extended over the entire clock face 120, as shown in FIGS. 4A, 4B.

When characters or the like are displayed on a wide area of the clock face 120 as shown in FIGS. 4A, 4B, the positions of the hands 123 of the analog display 12*a* may be adjusted so as not to disturb the digital display.

For example, when the digital display 12*b* is used as a main display, the hands 123 may be positioned to form a cross line as shown in FIG. 4B that divides the clock face 120 into upper and lower sections, regardless of the actual current time. The positions of the hands 123 are not limited to the example shown in FIG. 4B. The hands 123 may be positioned so as to form a vertical line that divides the clock face 120 into right and left sections, for example.

Figure 5A:
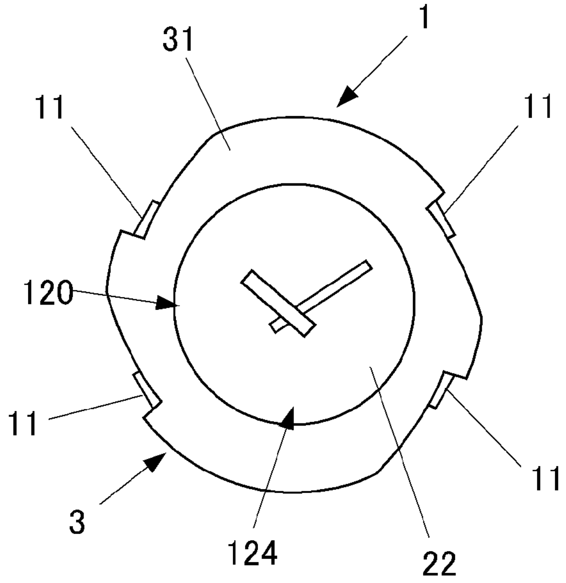
FIG. 5A is a schematic front view of the wristwatch with a modified display section, wherein the cover is in the first position.
Figure 5B:
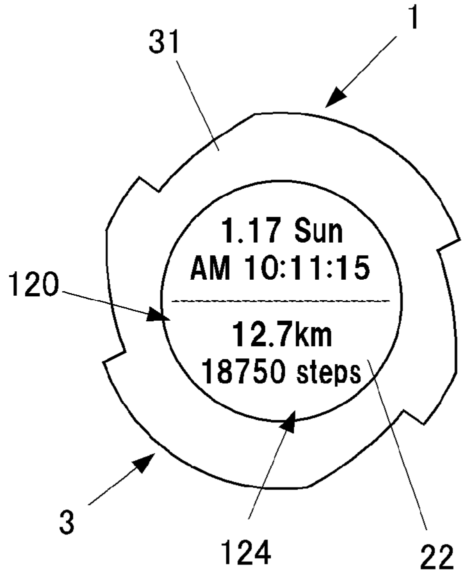
FIG. 5B is a schematic front view of the wristwatch with the modified display section, wherein the cover is in the second position.

The display 12 may only consist of the digital display 12*b* and may not include the analog display 12*a*, as exemplified in FIGS. 5A, 5B. Instead of an analog clock with hands, the digital display 12*b* may display indication of time with hands, as shown in FIG. 5A.

When the display section 124 of the digital display 12*b* extends over a relatively wide area of the clock face 120 as shown in FIGS. 4A, 4B and FIGS. 5A, 5B, a touchscreen 22 may be laid on the display 124.

The touchscreen 22 may constitute the second input detector 20 instead of or in addition to the motion detector 21 (e.g., acceleration sensor).

In the case, the CPU 41 (controller) receives input operations on the touchscreen 22 as valid input operations when the bezel 3 is in the second position.

The CPU 41 may receive input operations on the touchscreen 22 as valid input operations both when the bezel 3 is in the first position and when the bezel 3 is in the second position.

With the touchscreen 22, the user can easily do as detailed input/setting operations as with the operation buttons 11, or do more detailed input/setting operations than with the operation buttons 11. This allows the wristwatch 100 to be highly operable for the user.

The bezel 3 as the cover can be in the first position where input operations with the operation buttons 11 (first input detector 10) are valid, and the second position where input operations detected by the motion detector 21 (second input detector 20) are valid. In addition to these first and second positions, the bezel 3 may be in a third position where neither input operation is received, the input operation by the first input detector 10 or the input operation by the second input detector 20.

When the user wants to cover and protect the operation buttons 11 but does not want to change display contents, modes, and so forth, the bezel 3 in the third position can prevent operation errors caused by unintentional movements of the arm.

When the second input detector 20, which is different from the first input detector 10, includes multiple input means (e.g., the operation detector 21 and the touchscreen 22), the input mean the input operation of which is valid may be changed according to the position of the bezel 3. For example, when the bezel 3 is in the second position, input operations by all the input means constituting the second input detector 20 may be valid. When the bezel 3 is in the third position, input operations by only the touchscreen 22 among the input means constituting the second input detector 20 may be valid.

Thus, the wristwatch 100 can receive input operations in a way that better suits the user's preference and need. This increases usability of the wristwatch 100.

The contents displayed on the display 12 may be switched according to the position (first and second positions) of the cover (bezel 3), as shown in FIGS. 4A, 4B and FIGS. 5A, 5B.

For example, assume that input operations through the touchscreen are valid when the cover (bezel 3) is in the second position. In the case, when the cover (bezel 3) is in the second position, the layout of contents displayed on the display 12 may be automatically changed such that the user can easily input operations on the touchscreen.

In the above embodiment, the cover is the bezel 3 rotatable along the outer circumference of the watch case 1. However, the cover is not limited to the bezel 3, as long as the cover can be in the first position where the first input detector 10 is exposed and the second position where the first input detector 10 is covered.

For example, the cover may be a slidable lid or shutter that can be in the first position where the first input detector 10 is exposed and the second position where the first input detector 10 is covered by sliding.

In the case, the cover may not be rotatable along the outer circumference of the watch case 1 and therefore may not be round when seen from the top, as shown in FIG. 1A, etc. The watch case 1 may have a polygon shape when seen from the top, such as a square/rectangle or an octagon.

This increases flexibility in designing external shapes of the wristwatch 100.

Although the wrist device in the above embodiment is the wristwatch 100 as an example, the wrist device is not limited to a wristwatch.

For example, the wrist device may be a pedometer, heart rate monitor, altimeter, barometer, or a smartwatch.

Although one or more embodiments of the present invention have been described, the scope of the present invention is not limited to the above-described embodiment but includes the scope of claims and the scope of their equivalents.

What is claimed is:

1. A wrist device comprising:

a first input detector configured to detect a first input operation;

a second input detector different from the first input detector and configured to detect a second input operation;

a cover configured to be movable between a first position to expose the first input detector and a second position to cover the first input detector; and at least one processor configured to selectively receive one or more first input operation signals corresponding to the first input operation and one or more second input operation signals corresponding to the second input operation, wherein, in a case where the cover is in the first position, the at least one processor is configured to receive the one or more first input operation signals and not receive the one or more second input operation signals, and wherein, in a case where the cover is in the second position, the at least one processor is configured to receive the one or more second input operation signals and not receive the one or more first input operation signals.

2. The wrist device according to claim 1, wherein the second input detector includes an acceleration sensor configured to detect an acceleration of the wrist device, and wherein the at least one processor is configured to receive an input operation corresponding to the acceleration detected by the acceleration sensor as the second input operation in the case where the cover is in the second position.

3. The wrist device according to claim 1, wherein the second input detector includes a touchscreen, and wherein the at least one processor is configured to receive an input operation made on the touchscreen as the second input operation in the case where the cover is in the second position.

4. The wrist device according to claim 1, wherein the cover is a bezel that is rotatable at least by a certain degree, and wherein the bezel is movable between the first position and the second position by being rotated.

5. The wrist device according to claim 1, wherein the first input detector includes a first button and a second button, and wherein in the case where the cover is in the second position, the cover is configured to cover both the first button and the second button.

6. The wrist device according to claim 1, further comprising:

a first switch contact point and a second switch contact point, wherein, in the first position, the cover is configured to cause the first switch contact point to connect the first input detector to the processor, wherein, in the second position, the cover is configured to cause the second switch contact point to connect the second input detector to the processor, and wherein, ON/OFF of the first input detector and the second input detector is mechanically switched by rotation of the cover.

7. The wrist device according to claim 1, wherein the wrist device is configured to determine which is valid, the one or more first input operation signals or the one or more second input operation signals, through software.

* * * * *